United States Patent
Noh et al.

(10) Patent No.: US 9,587,053 B2
(45) Date of Patent: Mar. 7, 2017

(54) PREPARATION METHOD OF A PROPYLENE-1-BUTENE COPOLYMER AND A PROPYLENE-1-BUTENE COPOLYMER OBTAINED THEREFROM

(71) Applicant: LG CHEM, LTD., Seoul (KR)

(72) Inventors: Kyung Seop Noh, Daejeon (KR); Churl Young Park, Daejeon (KR); Won Hee Kim, Daejeon (KR); Sang Jin Jeon, Daejeon (KR); Ra Yun Choi, Daejeon (KR); Byung Seok Kim, Daejeon (KR); Ji Ho Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 15/023,585

(22) PCT Filed: Sep. 30, 2014

(86) PCT No.: PCT/KR2014/009202
§ 371 (c)(1),
(2) Date: Mar. 21, 2016

(87) PCT Pub. No.: WO2015/047030
PCT Pub. Date: Apr. 2, 2015

(65) Prior Publication Data
US 2016/0251460 A1     Sep. 1, 2016

(30) Foreign Application Priority Data

Sep. 30, 2013 (KR) .................. 10-2013-0116655
Sep. 30, 2014 (KR) .................. 10-2014-0130845

(51) Int. Cl.
| | | |
|---|---|---|
| *C08F 210/06* | (2006.01) | |
| *C08F 210/08* | (2006.01) | |
| *C08F 4/642* | (2006.01) | |
| *C08F 4/643* | (2006.01) | |
| *C08F 4/6592* | (2006.01) | |
| *C08F 210/04* | (2006.01) | |
| *C08F 2/38* | (2006.01) | |

(52) U.S. Cl.
CPC .......... *C08F 210/06* (2013.01); *C08F 4/6592* (2013.01); *C08F 210/04* (2013.01); *C08F 210/08* (2013.01)

(58) Field of Classification Search
CPC .. C08F 210/08; C08F 4/6028; C08F 4/63908; C08F 4/63927; C08F 4/65908; C08F 4/65927; C08F 210/06; C08F 2500/12
USPC ............................. 526/127, 133, 160, 348.6
See application file for complete search history.

(56) References Cited

U.S. PATENT DOCUMENTS

| | | |
|---|---|---|
| 5,064,802 A | 11/1991 | Stevens et al. |
| 5,455,365 A | 10/1995 | Winter et al. |
| 5,869,584 A | 2/1999 | Winter et al. |
| 7,294,600 B2 | 11/2007 | Lee et al. |
| 8,168,556 B2 | 5/2012 | Schulte et al. |
| 2004/0127614 A1 | 7/2004 | Jiang et al. |
| 2007/0293640 A1 | 12/2007 | Jiang et al. |
| 2011/0293867 A1* | 12/2011 | Bernreitner ............ C08F 10/00 428/36.9 |
| 2012/0059135 A1 | 3/2012 | Michiue et al. |
| 2012/0149829 A1 | 6/2012 | Canich et al. |
| 2012/0245299 A1 | 9/2012 | Jiang et al. |
| 2012/0329966 A1 | 12/2012 | Kwon et al. |
| 2015/0031844 A1 | 1/2015 | Lee et al. |

FOREIGN PATENT DOCUMENTS

| | | |
|---|---|---|
| CN | 101838362 A | 9/2010 |
| CN | 102781972 A | 11/2012 |
| DE | 19527047 A1 | 1/1997 |
| EP | 2 532 687 A2 | 12/2012 |
| JP | 08-239416 A | 9/1996 |
| JP | 3268903 B2 | 3/2002 |
| JP | 2012012427 A | 1/2012 |
| JP | 2012117043 A | 6/2012 |
| KR | 100579843 B1 | 5/2006 |
| KR | 20060116557 A | 11/2006 |
| KR | 1020110101385 A | 9/2011 |
| KR | 20130049148 A | 5/2013 |
| KR | 101278336 B1 | 6/2013 |
| WO | 2013/007650 A1 | 1/2013 |
| WO | 2013066109 A1 | 5/2013 |

* cited by examiner

*Primary Examiner* — Fred M Teskin
(74) *Attorney, Agent, or Firm* — Dentons US LLP

(57) ABSTRACT

The disclosed is a preparation method of a propylene-1-butene copolymer by using a catalyst that includes a novel metallocene compound having excellent copolymerization activity.

10 Claims, No Drawings

PREPARATION METHOD OF A PROPYLENE-1-BUTENE COPOLYMER AND A PROPYLENE-1-BUTENE COPOLYMER OBTAINED THEREFROM

This application is a National Stage Entry of International Application No. PCT/KR2014/009202, filed Sep. 30, 2014, and claims the benefit of Korean Application No. 10-2013-0116655, filed on Sep. 30, 2013, and Korean Application No. 10-2014-0130845, filed Sep. 30, 2014, all of which are hereby incorporated by reference in their entirety for all purposes as if fully set forth herein.

BACKGROUND OF THE INVENTION (a) Field of the Invention

The present invention relates to a preparation method of a propylene-1-butene copolymer and a propylene-1-butene copolymer obtained therefrom. More specifically, it relates to a method of preparing a propylene-1-butene copolymer by using a catalyst that includes a novel metallocene compound having an excellent copolymerization activity, and a propylene-1-butene copolymer obtained by the method.

(b) Description of the Related Art

Dow Co. had presented [Me$_2$Si(Me$_4$C$_5$)NtBu]TiCl$_2$ (Constrained-Geometry Catalyst, hereinafter 'CGC') in the early 1990's (U.S. Pat. No. 5,064,802), the superior aspects of the CGC to prior known metallocene catalysts in copolymerization reaction of ethylene and α-olefin can be largely summarized into two ways as follows: (1) it shows high activity even in high polymerization temperature and forms a polymer of high molecular weight, (2) the copolymerizing ability of α-olefin such as 1-hexene and 1-octene which have large steric hindrance is also very excellent. In addition, as various characteristics in the polymerization reaction of the CGC became gradually known, there have been many efforts to synthesize derivatives of the same for using it as a polymerization catalyst in the academic world and the industrial world.

Group 4 transition metal compound which has one or two cyclopentadienyl groups as the ligand can be used as a catalyst for olefin polymerization by activating the same with methylaluminoxane or a boron compound. Such catalyst shows unique characteristics that traditional Ziegler-Natta catalyst cannot realize.

Namely, the polymer obtained by using such catalyst has narrow molecular weight distribution and more good reactivity to the second monomer such as α-olefin or cycloolefin, and the second monomer distribution in the polymer is even. Furthermore, it is possible to control the stereoselectivity of the polymer in the polymerization of α-olefin by changing the substituent of the cyclopentadienyl ligand in the metallocene catalyst, and the degree of copolymerization, the molecular weight, and the distribution of the second monomer can be easily controlled in copolymerization of ethylene and other olefins.

Meanwhile, since the metallocene catalyst is more expensive than Ziegler-Natta catalyst, it must have good activity for its economic value. If it has good reactivity to the second monomer, there is an advantage of that the polymer including large content of the second monomer can be obtained by using only small amount of the second monomer.

As the results that many researchers have studied various catalysts, it is proved that generally a bridged catalyst has good reactivity to the second monomer. The bridged catalyst developed until now can be classified into three types according the type of the bridge. The first type is the catalyst of which two cyclopentadienyl ligands are connected with an alkylene dibridge by the reaction of an electrophile like an alkyl halide and indene or fluorene, the second type of the silicone-bridged catalyst of which the ligands are connected with —SiR$_2$—, and the third type is the methylene-bridged catalyst which is obtained by the reaction of fulvene and indene or fluorene.

However, very few catalysts have been being applied in practice in commercial factories among above attempts, and thus the preparation of catalyst showing more improved polymerization performance is still required.

Furthermore, the metallocene compound is usually supported on a carrier when it is used to a gas phase or slurry process commerciallized in practice. At this time, it is attempted to load a cocatalyst together onto the carrier for securing the activity without using an additional cocatalyst in the polymerization process, but there is a disadvantage of that the heterogeneous catalyst supported on a carrier shows lower activity than the homogeneous catalyst that is not supported on a carrier in general.

SUMMARY OF THE INVENTION

To resolve above problems, it is an aspect of the present invention to provide a method of preparing a propylene-1-butene copolymer by polymerizing propylene and 1-butene in the presence of a catalyst including a metallocene compound of a novel structure.

It is another aspect of the present invention to provide a propylene-1-butene copolymer obtained by the preparation method.

The present invention provides a method of preparing a propylene-1-butene copolymer including the step of polymerizing propylene and 1-butene in the presence of a catalyst including a metallocene compound represented by the following Chemical Formula 1.

[Chemical Formula 1]

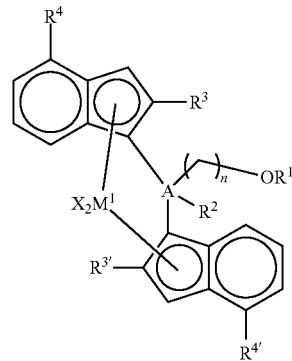

In Chemical Formula 1,

M$^1$ is a group 3 transition metal, a group 4 transition metal, a group 5 transition metal, a lanthanide transition metal, or an actinide transition metal;

X is, same to or different from each other, a halogen;

A is a group 14 element which is a bridge group connecting indenyl groups;

R$^1$ is a C$_1$-C$_{20}$ alkyl, alkenyl, alkylaryl, arylalkyl, or aryl;

R$^2$ is hydrogen, or a C$_1$-C$_{20}$ alkyl, alkenyl, alkylaryl, arylalkyl, or aryl;

R$^3$, R$^{3'}$, R$^4$, and R$^{4'}$ are, same to or different from each other, respectively a C$_1$-C$_{20}$ alkyl, alkenyl, alkylaryl, arylalkyl, or aryl; and n is an integer of 1 to 20.

The present invention also provides a propylene-1-butene copolymer obtained by the preparation method.

According to the preparation method of a propylene-1-butene copolymer of the present invention, the properties of the copolymer can be easily controlled and the propylene-1-butene copolymer having excellent mechanical properties can be obtained, because the copolymer is prepared by copolymerizing propylene and 1-butene by using a novel metallocene compound having an excellent copolymerization activity and hydrogen reactivity.

Furthermore, the propylene-1-butene copolymer obtained by the preparation method of a propylene-1-butene copolymer according to the present invention shows high transparency, and it can be used in various ways because of its excellent mechanical property, fluidity, crystallinity, and so on.

DETAILED DESCRIPTION OF THE EMBODIMENTS

Hereinafter, the preparation method of a propylene-1-butene copolymer and the propylene-1-butene copolymer obtained by the preparation method according to concrete embodiments of the present invention are explained in more detail. However, the followings are only for the understanding of the present invention and the scope of the present invention is not limited to or by them, and it is obvious to a person skilled in the related art that the embodiments can be variously modified in the scope of the present invention.

In addition, "include" or "comprise" means to include any components (or ingredients) without particular limitation unless there is no particular mention about them in this description, and it cannot be interpreted as a meaning of excluding an addition of other components (or ingredients).

According to one aspect of the present invention, the present invention provides a method of preparing propylene-1-butene copolymer including the step of polymerizing propylene and 1-butene in the presence of a catalyst including a metallocene compound represented by the following Chemical Formula 1.

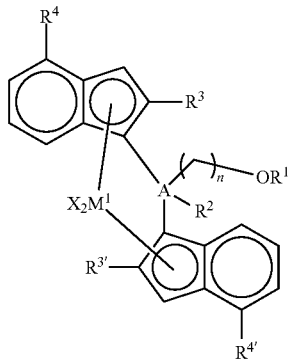

[Chemical Formula 1]

In Chemical Formula 1, $M^1$ is a group 3 transition metal, a group 4 transition metal, a group 5 transition metal, a lanthanide transition metal, or an actinide transition metal;

X is, same to or different from each other, a halogen;

A is a group 14 element which is a bridge group connecting indenyl groups;

$R^1$ is a $C_1$-$C_{20}$ alkyl, alkenyl, alkylaryl, arylalkyl, or aryl;

$R^2$ is hydrogen, or a $C_1$-$C_{20}$ alkyl, alkenyl, alkylaryl, arylalkyl, or aryl;

$R^3$, $R^{3'}$, $R^4$, and $R^{4'}$ are, same to or different from each other, respectively a $C_1$-$C_{20}$ alkyl, alkenyl, alkylaryl, arylalkyl, or aryl; and n is an integer of 1 to 20.

Preferably, $R^1$ and $R^2$ may be respectively a $C_1$-$C_4$ alkyl; $R^3$ and $R^{3'}$ may be respectively a $C_1$-$C_{20}$ alkyl, alkenyl, or arylalkyl; $R^4$ and $R^{4'}$ may be respectively a $C_1$-$C_{20}$ aryl or alkylaryl; n may be an integer of 1 to 6; and A may be silicon (Si), in Chemical Formula 1.

The metallocene compound of Chemical Formula 1 includes two indenyl groups in which non-hydrogen substituents are introduced to both of 2-position and 4-position as ligands. Specifically, it has an advantage in that the activity of the catalyst can be maximized because the bridge group connecting the ligands is substituted with the functional group which can take a role of Lewis base as an oxygen-donor. Furthermore, it can show high polymerization activity even when it is supported on a carrier. Accordingly, the compound represented by Chemical Formula 1 can prepare a polyolefin having desired properties more easily when it is used as a catalyst for preparing polyolefin by itself or in a supported form.

According to one embodiment of the present invention, the metallocene compound of Chemical Formula 1 may be used in the preparation method of a propylene-1-butene copolymer in the form of a supported catalyst including the metallocene compound solely or in combination with a cocatalyst on a carrier. The cocatalyst may include an alkylaluminoxane cocatalyst and a boron-based cocatalyst.

The carrier is not limited particularly in the present invention if it is common in the related art but one or more carriers selected from the group consisting of silica, silica-alumina and silica-magnesia may be used preferably. Meanwhile, when the catalyst is supported on a carrier like silica, the silica carrier and the functional group of the metallocene compound are chemically bonded. Therefore, it has an advantage in that the catalyst is hardly released from the surface of the carrier during the olefin polymerization process, and there is no fouling that is the adhesion of polymer onto a reactor wall or between polymer particles when the propylene-1-butene copolymer is prepared by a slurry or vapor phase polymerization.

And, the propylene-1-butene copolymer prepared in the presence of the supported catalyst including such carrier is superior in the particle shape of polymer and the apparent density, and can be properly used to a traditional slurry polymerization, bulk polymerization, and vapor phase polymerization.

Therefore, a carrier dried at high temperature and having siloxane groups of high reactivity may be used. Specifically, silica, silica-alumina, and the like dried at high temperature may be used, and they may include an oxide, a carbonate, a sulfate or a nitrate component, such as $Na_2O$, $K_2CO_3$, $BaSO_4$, $Mg(NO_3)_2$, and so on.

According to one embodiment of the present invention, the metallocene compound of Chemical Formula 1 may be used as a catalyst for the polymerization of propylene and 1-butene, in company with an alkylaluminoxane cocatalyst, a boron-based cocatalyst, and so on.

The alkylaluminoxane cocatalyst may be represented by Chemical Formula 2.

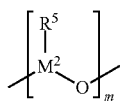

[Chemical Formula 2]

In Chemical Formula 2, $M^2$ is a group 13 metal element;

$R^5$ is, same to or different from each other, respectively a $C_1$-$C_{20}$ alkyl, alkenyl, alkylaryl, arylalkyl, or aryl; and m may be an integer of 2 or more.

Preferably, in the alkylaluminoxane cocatalyst of Chemical Formula 2, $R^5$ may be respectively methyl, ethyl, propyl, isopropyl, isopropenyl, n-butyl, sec-butyl, tert-butyl, pentyl, hexyl, octyl, decyl, dodecyl, tridecyl, tetradecyl, pentadecyl, hexadecyl, octadecyl, eikosyl, dokosyl, tetrakosyl, cyclohexyl, cyclooctyl, phenyl, tolyl, or ethylphenyl; and $M^2$ may be aluminum.

And, in Chemical Formula 2, m may be an integer of 2 or more, or 2 to 500, preferably an integer of 6 or more, or 6 to 300, and more preferably an integer of 10 or more, or 10 to 100.

The alkylaluminoxane cocatalyst is characterized in that it includes metal elements which can act as a Lewis acid and can form a bond through Lewis acid-base interaction with the functional group introduced to the bridge group of the metallocene compound of Chemical Formula 1. The cocatalyst compound of Chemical Formula 2 may exist in a linear form, a circular form, or a network form. For example, the cocatalyst may be one or more of methylaluminoxane, ethylaluminoxane, propylaluminoxane, butylaluminoxane, and so on.

Furthermore, the catalyst for the polymerization of a propylene-1-butene copolymer of the present invention may include a non-alkylaluminoxane cocatalyst including a non-coordinative anion in company with the alkylaluminoxane cocatalyst. Specifically, according to one embodiment of the present invention, a boron-based cocatalyst may be used as the non-alkylaluminoxane cocatalyst.

The boron-based cocatalyst may be one or more selected from the group consisting of dimethylanilinium tetrakis(pentafluorophenyl)borate ([HN(CH$_3$)$_2$C$_6$H$_5$][B(C$_6$F$_5$)$_4$]), trityl tetrakis(pentafluorophenyl)borate ([(C$_6$H$_5$)$_3$C][B(C$_6$F$_5$)$_4$]), and methylanilinium tetrakis(pentafluorodiphenyl)borate ([HN(CH$_3$)(C$_6$H$_5$)$_2$][B(C$_6$F$_5$)$_4$]).

The boron-based cocatalyst stabilizes the metallocene compound and makes it maintain its activity in the polymerization. Specifically, the metallocene compound of the present invention has a tether, and it can show excellent activity without generating fouling because there is no leaching phenomenon in the polymerization because of the functional group. However, if there is no tether in the structure as prior known metallocene compounds, there is a problem of that the leached catalyst precursor and the boron-based cocatalyst react and cause fouling in the main.

The preparation method of the present invention can prepare a supported catalyst having more improved activity by loading both of the alkylaluminoxane cocatalyst and the boron-based cocatalyst, the non-alkylaluminoxane cocatalyst, together onto the carrier. Furthermore, the present inventors selected 2 kinds of cocatalysts that do not cause an opposite effect with each other, and found an optimal loading ratio thereof through experiments.

In the preparation method of a propylene-1-butene copolymer according to one embodiment of the present invention, the amount of the metallocene compound supported on the carrier may be about 40 to about 240 μmol, preferably about 80 to about 160 μmol, per the weight of the carrier, for example, based on 1 g of silica.

Furthermore, the amount of the alkylaluminoxane cocatalyst supported on the carrier may be about 8 to about 25 mmol, preferably about 10 to about 20 mmol, per the weight of the carrier, for example, based on 1 g of silica.

The amount of the boron-based cocatalyst supported on the carrier may be about 50 to about 300 μmol, preferably about 64 to about 240 μmol, per the weight of the carrier, for example, based on 1 g of silica.

In the preparation method of a propylene-1-butene copolymer according to one embodiment of the present invention, the catalyst has more improved catalytic activity than a supported catalyst including only one kind of cocatalyst and can prepare a propylene-1-butene copolymer with improved activity even if the loading conditions of the metallocene compound are changed, namely, reaction temperature, reaction time, kind of silica, loading amount of the metallocene compound, and so on are changed.

Here, the polymerization of propylene and 1-butene may be carried out at the temperature of about 25 to about 500° C. and the pressure of about 1 to about 100 kgf/cm$^2$ for about 1 to about 24 hrs. At this time, the polymerization reaction temperature is preferably about 25 to about 200° C. and more preferably about 50 to about 100° C. And, the polymerization reaction pressure is preferably about 1 to about 70 kgf/cm$^2$ and more preferably about 5 to about 50 kgf/cm$^2$. The polymerization reaction time is preferably about 1 to about 5 hrs.

The preparation method of a propylene-1-butene copolymer of the present invention may be carried out by contacting propylene and 1-butene with the catalyst including the metallocene compound represented by Chemical Formula 1.

At this time, said propylene and 1-butene may be polymerizaed with the weight ratio of about 99.5:0.5 to about 85:15, preferably about 99:1 to about 90:10, but it is not limited to this.

Furthermore, according to one embodiment of the present invention, the polymerization of propylene and 1-butene may be carried out in the presence of hydrogen gas.

At this time, the hydrogen gas activates inactive sites of the metallocene catalyst and controls the molecular weight of the polymer by causing a chain transfer reaction. The metallocene compound of the present invention is superior in hydrogen reactivity, and thus the propylene-1-butene copolymer having the required level of molecular weight distribution can be effectively obtained by controlling the amount of the hydrogen gas used in the polymerization process.

Here, the amount of the hydrogen gas used may be about 10 to about 2,000 ppm, preferably about 50 to about 1,500 ppm, based on the total weight of propylene.

The molecular weight distribution and the fluidity of the prepared propylene-1-butene copolymer can be controlled in the required range with showing sufficient catalytic activity by controlling the amount of the hydrogen gas used, and thus it is possible to prepare the propylene-1-butene copolymer having a proper property according to the use.

The preparation method of a propylene-1-butene copolymer may be carried out according to a solution polymerization process, a slurry process, or a gas phase process by using a continuous slurry polymerization reactor, a loop slurry reactor, a gas phase reactor, or a solution reactor.

In the preparation method of a propylene-1-butene copolymer according to the present invention, the catalyst may be introduced into a reactor after dissolving or diluting the same in a $C_5$-$C_{12}$ aliphatic hydrocarbon solvent, for example, pentane, hexane, heptane, nonane, decane, and an isomer thereof; an aromatic hydrocarbon solvent such as toluene and benzene; and a chlorinated hydrocarbon solvent such as dichloromethane and chlorobenzene. Here, it is preferable to use the solvent after eliminating a little water or air that acts as a catalytic poison therefrom by treating the same with a small quantity of alkylaluminum.

According to another embodiment of the present invention, a propylene-1-butene copolymer obtained by the preparation method is provided.

As disclosed above, according to the present invention, the propylene-1-butene copolymer satisfying strength and softness at the same time can be obtained by using the catalyst including said novel metallocene compound, compared with the copolymer prepared by using an existing metallocene compound.

The propylene-1-butene copolymer may be a random copolymer. The random copolymer can be used to packaging containers, films, sheets, injection molded parts, and so on that requires transparency because of its low processing temperature and excellent transparency and fluidity.

According to one embodiment of the present invention, the prepared propylene-1-butene copolymer may have the weight average molecular weight (Mw) of about 50,000 to about 500,000 g/mol, preferably about 100,000 to about 300,000 g/mol, when the copolymerization process of propylene and 1-butene is carried out by using the catalyst including the metallocene compound.

Furthermore, the propylene-1-butene copolymer prepared by the method may show the molecular weight distribution (Mw/Mn) of about 1 to about 5, preferably about 2 to about 3.5.

Furthermore, the propylene-1-butene copolymer may have the 1-butene content of about 0.5 to about 15 wt %, preferably about 1 to about 10 wt %, based on the total weight of the copolymer.

Furthermore, the solubility in xylene (Xs) of the propylene-1-butene copolymer may be about 3 wt % or less, preferably about 2 wt % or less, and more preferably about 1 wt % or less, and it represents high tacticity. The solubility in xylene is the content (wt %) of the xylene soluble portion of the copolymer dissolved in a cooled xylene prepared by dissolving the propylene-1-butene copolymer in xylene and crystallizing the insoluble portion of the copolymer therefrom by cooling the solution. The xylene soluble portion includes the polymer chains having low tacticity, and thus the lower solubility in xylene, the higher tacticity.

The propylene-1-butene copolymer prepared according to the present invention may have high melting point (Tm) along with high tacticity disclosed above. For example, the melting point (Tm) of the propylene-1-butene copolymer may be about 130° C. or more or about 130 to about 180° C., preferably about 130 to about 150° C., more preferably about 133 to about 148° C.

Furthermore, the propylene-1-butene copolymer prepared according to the present invention may show the crystallization temperature (Tc) of about 80 to about 120° C., preferably about 85 to about 100° C.

Furthermore, the propylene-1-butene copolymer prepared according to the present invention may show high fluidity. For example, the propylene-1-butene copolymer prepared according to the present invention shows high fluidity by having high melt index (MI) of about 10 g/10 min or more, preferably about 10 to about 40 g/10 min, more preferably about 15 to about 35 g/10 min, measured at 230° C. with the load of 2.16 kg.

Furthermore, the propylene-1-butene copolymer prepared according to the present invention shows the characteristic of satisfying strength and flexibility at the same time by having the tensile strength of about 280 kg/cm² or more, or about 290 kg/cm² or more, or about 300 kg/cm² or more, and the elongation of about 500% or more, or about 600% or more.

In the present invention, items besides above disclosure can be added or subtracted with necessity and the present invention does not limit them particularly.

Hereinafter, preferable examples are presented for understanding the present invention. However, the following examples are only for illustrating the present invention more easily and the present invention is not limited to or by them.

EXAMPLES

Synthesis Examples

Synthesis of Metallocene Compound

Synthesis Example 1

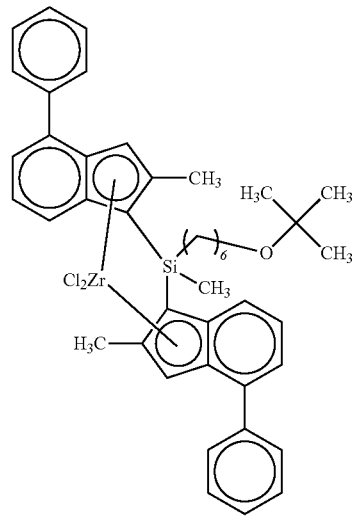

Step 1: Preparation of (6-t-butoxyhexyl)dichloromethylsilane

After slowly adding 100 mL of t-butoxyhexyl magnesium chloride solution (about 0.14 mol, ether) to 100 mL of trichloromethylsilane solution (about 0.21 mol, hexane) in drops at −100° C. for 3 hrs, the mixture was stirred at room temperature for 3 hrs.

After separating a transparent organic layer from the mixture solution, an excess of trichloromethylsilane was eliminated therefrom by vacuum drying the transparent organic layer. By this, (6-t-butoxyhexyl)dichloromethylsilane (yield 84%) of transparent liquid phase was obtained.

$^1$H NMR (500 MHz, CDCl$_3$, 7.24 ppm): 0.76(3H, s), 1.11(2H, t), 1.18(9H,s), 1.32~1.55(8H, m), 3.33(2H, t)

Step 2: Preparation of (6-t-butoxyhexyl)(methtyl)-bis(2-methyl-4-phenylindenyl)silane 15.4 mL of n-butyllithium solution (2.5 M, hexane solvent) was slowly added to 77 mL of 2-methyl-4-phenylindene toluene/THF=10/1 solution (34.9 mmol) in drops at 0° C., and the mixture solution was stirred at 80° C. for 1 hr and further stirred at room temperature for a day. After then, 5 g of (6-t-butoxyhexyl)dichloromethylsilane prepared above was slowly added to the mixture solution in drops at −78° C. and the mixture was stirred for 10 mins and further stirred at 80° C. for 1 hr. After separating the organic layer therefrom by adding water thereto, a sticky yellow oil (racemic:meso=1:1) was obtained with the yield of 78% by refining the product with a silica column and vacuum drying the same.

$^1$H NMR (500 MHz, CDCl$_3$, 7.24 ppm): 0.10(3H, s), 0.98(2H, t), 1.25(9H, s), 1.36~1.50(8H, m), 1.62(8H, m), 2.26(6H, s), 3.34(2H, t), 3.81(2H, s), 6.87(2H, s), 7.25(2H, t), 7.35(2H, t), 7.45(4H, d), 7.53(4H, t), 7.61(4H, d)

Step 3: Preparation of [(6-t-butoxyhexylmethylsilanediyl)-bis(2-methyl-4-phenylindenyl)]zirconium dichloride 3.0 mL of n-butyllithium solution (2.5 M in hexane) was slowly added to 50 mL of (6-t-butoxyhexyl)(methyl)-bis(2-methyl-4-phenyl)indenylsilane ether/hexane=1/1 solution (3.37 mmol) prepared above in drops at −78° C., and the mixture was stirred at room temperature for about 2 hrs and vacuum dried. After then, the yellow solid was obtained by washing the salt with hexane and filtering and vacuum drying the same. After weighing the synthesized ligand salt and bis(N,N'-diphenyl-1,3-propanediamido)dichlorozirconium bis(tetrahydrofuran) [Zr(C$_5$H$_6$NCH$_2$CH$_2$CH$_2$NC$_5$H$_6$)Cl$_2$(C$_4$H$_8$O)$_2$] in a glove box, ether was slowly added thereto in drops at −78° C. and the mixture was stirred at room temperature for a day. After then, the red reaction solution was filtered and separated therefrom, and 4 equivalent of HCl ether solution (1 M) was slowly added thereto in drops at −78° C. and the mixture was stirred for 3 hrs. And then, the metallocene compound of orange solid form (racemic:meso=10:1) was obtained with the yield of 85% by filtering and vacuum drying the same.

$^1$H NMR (500 MHz, C$_6$D$_6$, 7.24 ppm): 1.19(9H, s), 1.32(3H, s), 1.48~1.86(10H, m), 2.25(6H, s), 3.37(2H, t), 6.95(2H, s), 7.13(2H, t), 7.36(2H, d), 7.43(6H, t), 7.62(4H, d), 7.67(2H, d)

Comparative Synthesis Example 1

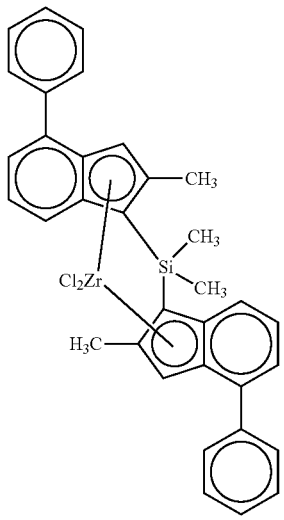

Step 1: Preparation of dimethylbis(2-methyl-4-phenylindenyl)silane 21.8 mL of n-butyllithium solution (2.5 M, hexane solvent) was slowly added to 77 mL of 2-methyl-4-phenylindene toluene/THF=10/1 solution (49.5 mmol) in drops at 0° C., and the mixture solution was stirred at 80° C. for 1 hr and further stirred at room temperature for a day. After then, 2.98 mL of dichloromethylsilane was slowly added thereto in drops at 0° C. or less, and the mixture was stirred for about 10 mins and further stirred at 80° C. for 1 hr. After separating the organic layer therefrom by adding water thereto, a sticky yellow oil (racemic:meso=1:1) was obtained with the yield of 61% by refining the product with a silica column and vacuum drying the same.

$^1$H NMR (500 MHz, CDCl$_3$, 7.24 ppm): 0.02(6H, s), 2.37(6H, s), 4.00(2H, s), 6.87(2H, t), 7.38(2H, t), 7.45(2H, t), 7.57(4H, d), 7.65(4H, t), 7.75(4H, d)

Step 2: Preparation of [dimethylsilanediylbis(2-methyl-4-phenylindenyl)]zirconium dichloride 10.9 mL of n-butyllithium solution (2.5 M in hexane) was slowly added to 240 mL of dimethylbis(2-methyl-4-phenylindenyl)silane ether/hexane=1/1 solution (12.4 mmol) in drops at −78° C. The mixture was stirred at room temperature for a day, and a light yellow solid was obtained by filtering and vacuum drying the same. After weighing the synthesized ligand salt and bis(N,N'-diphenyl-1,3-propanediamido)dichlorozirconiumbis(tetrahydrofuran) in a glove box, ether was slowly added thereto in drops at −78° C. and the mixture was stirred at room temperature for a day. After filtering the mixture and separating the red solution therefrom, the clean red solution was obtained by vacuum drying the same and adding toluene/ether=1/2 solution thereto. 1.5 to 2 equivalent of HCl ether solution (1 M) was slowly added thereto in drops at −78° C. and the mixture was stirred at room temperature for 3 hrs. And then, the catalyst of orange solid component (racemic only) was obtained with the yield of 70% by filtering and vacuum drying the same.

$^1$H NMR (500 MHz, C$_6$D$_6$, 7.24 ppm): 1.32(6H, s), 2.24(6H, s), 6.93(2H, s), 7.10(2H, t), 7.32(2H, t), 7.36(2H, d), 7.43(4H, t), 7.60(4H, d), 7.64(2H, d)

Preparation Examples

Preparation of a Supported Catalyst

Preparation Example 1

After weighing 3 g of silica L203F in a schlenk flask, 40 mmol of methylaluminoxane (MAO) was added thereto and the mixture was reacted at 95° C. for 24 hrs. After precipitation, the upper part was eliminated and the rest was washed twice with toluene. Subsequently, after dissolving 360 μmol of the metallocene compound obtained in Synthesis Example 1 in toluene, the solution was reacted at 75° C. for 5 hrs. When the precipitation was finished after the reaction, the solution of upper part was eliminated and the left reaction product was washed with toluene. 252 μmol of dimethyl anilinium tetrakis(pentafluorophenyl)borate was reacted at 75° C. for 5 hrs. The reaction product was washed with toluene and further washed with hexane after the reaction, and 5 g of solid type metallocene catalyst supported on silica was obtained by vacuum drying the same.

Comparative Preparation Example 1

A supported catalyst was prepared according to the same method as in Preparation Example 1, except that the metallocene compound obtained in Comparative Synthesis Example 1 was used instead of the metallocene compound obtained in Synthesis Example 1.

Examples of propylene-1-butene Copolymerization

Example 1

The polymerization was carried out by using 2 continuous loop reactors. More specifically, triethylaluminum (TEAL) and hydrogen gas were respectively introduced thereto by using separate pumps, and the bulk-slurry copolymerization of propylene and 1-butene was carried out. At this time, a mud catalyst that was prepared by mixing the supported catalyst (20 wt %) obtained in Preparation Example 1 with an oil and grease was used. The temperature of the reactor was 70° C., and the output per an hour was about 40kg.

Examples 2 to 6

The polymerization process was carried out according to the same method as in Example 1, except that the input of 1-butene and the details of the operating conditions were changed.

Comparative Example 1

The polymerization process was carried out according to the same method as in Example 1, except that 1-butene was not used and only propylene was used in the polymerization.

Comparative Examples 2 to 4

The polymerization of propylene or the bulk-slurry copolymerization of propylene and 1-butene was carried out according to the same method as in Example 1, except that the supported catalyst obtained in Comparative Preparation Example 1 was used and the details of the operating conditions were changed.

The details of operating conditions of Examples 1 to 6 and Comparative Examples 1 to 4 are listed in the following Table 1.

content (μmol) of the metallocene compound included in the supported catalyst were calculated, based on unit time (h).

(2) Melt Index (MI)

It was measured at 230° C. with the load of 2.16 kg according to ASTM D1238 and represented by the weight (g) of the polymer that was melted and discharged for 10 mins.

(3) Content of 1-butene

According to ASTM D5576, after fixing the film or the specimen of a film form to the magnetic holder of FT-IR analyzer, the height of 4800~3500 $cm^{-1}$ peak reflecting the thickness of the specimen and the area of 790~660 $cm^{-1}$ peak indicating butene component were calculated from the IR absorption spectrum. The measured values were substituted into the Calibration Equation obtained by plotting the value obtained by dividing the area of 790~660 $cm^{-1}$ peak by the height of 4800~3500 $cm^{-1}$ peak of the standard sample.

(4) Melting Point (Tm)

DSC (Differential Scanning Calorimeter, manufactured by TA Co.) curve was obtained with elevating the temperature to 200° C., maintaining the temperature for 5 mins, lowering the temperature to 30° C., and elevating the temperature again. At this time, the scanning speed of heating and cooling processes was 10° C./min and the temperature of the highest peak of the curve obtained during the second heating process was determined as the melting point.

(5) Density

After making the polymer into a sheet of 3 mm thickness and 2 cm diameter by using a press mold of 210° C., the weight was measured with 10° C./min by a mettler scale.

(6) Solubility in Xylene (Xs)

After putting the sample in xylene, it was heated at 135° C. for 1 hr and cooled for 30 mins for a pretreatment. After stabilizing the base line of RI, DP, IP by making xylene flow into OminiSec (Viscotek Co. FIPA) device for 4 hrs with the

TABLE 1

| | Polymerization Temperature (° C.) | Polymerization Pressure (kg/cm$^2$) | Catalyst Input (g/hr) | Propylene Input (kg/hr) | 1-butene Input (wt %) | TEAL Input (ppm) | Hydrogen Input (ppm) |
|---|---|---|---|---|---|---|---|
| Example 1 | 70 | 35 | 1.2 | 80 | 1.0 | 50 | 100 |
| Example 2 | 70 | 35 | 1.1 | 80 | 2.0 | 50 | 100 |
| Example 3 | 70 | 35 | 1.1 | 80 | 3.0 | 50 | 100 |
| Example 4 | 70 | 35 | 1.0 | 80 | 4.0 | 50 | 100 |
| Example 5 | 70 | 35 | 1.0 | 80 | 5.0 | 50 | 100 |
| Example 6 | 70 | 35 | 1.0 | 80 | 6.0 | 50 | 100 |
| Comparative Example 1 | 70 | 35 | 1.2 | 80 | 0.0 | 50 | 400 |
| Comparative Example 2 | 70 | 35 | 1.5 | 80 | 0.0 | 50 | 400 |
| Comparative Example 3 | 70 | 35 | 1.5 | 80 | 2.0 | 50 | 100 |
| Comparative Example 4 | 70 | 35 | 1.4 | 80 | 4.0 | 50 | 100 |

<Measurements on the Properties of the Polymer>

The properties of the polymers obtained in Examples 1 to 6 and Comparative Examples 1 to 4 were measured by the following methods and the results are listed in Tables 2 and 3.

(1) Catalytic Activity

The ratio of the weight (kg PP) of the produced polymer per the amount (g) of the supported catalyst used and the ratio of the weight (kg PP) of the produced polymer per the flow rate of 1 ml/min, the concentration of the pretreated sample and the amount thereof injected were filled therein, and the device was operated and the area of the peak was calculated.

(7) Particle Size

After putting the sample in the hopper of the laser diffraction particle size analyzer (Symatec Co., HELOS), APS (Average Particle Size), the span value and the content of the particles of 200 μm or less (fine particles) were checked by setting up the method of 50 to 3500 μm range.

(8) Tensile Strength and Elongation

The thickness of the film specimen was measured at first and the specimen was fixed to the UTM device (ZWICK Roell Co.). After filling the cross-section area of the specimen in the device, the properties were measured with the speed of 200 mm/min in the directions of MD and TD of the specimen. Elongation (%) and yield load (kgf) of the specimen were measured and tensile strength (kg/cm$^2$) was obtained by dividing the load (kg) at break by the cross-section area (m$^2$).

TABLE 2

|  | Activity (kg/g cat) | Melt Index (g/10 min) | Content of 1-butene (wt %) | Melting Point (° C.) | Density (g/cm$^3$) |
| --- | --- | --- | --- | --- | --- |
| Example 1 | 28.9 | 19 | 1.3 | 146.1 | 0.9 |
| Example 2 | 29.5 | 21 | 2.3 | 143.0 | 0.9 |
| Example 3 | 30.1 | 23 | 3.7 | 138.0 | 0.9 |
| Example 4 | 32.2 | 27 | 5.0 | 134.4 | 0.9 |
| Example 5 | 31.8 | 24 | 6.8 | 131.8 | 0.9 |
| Example 6 | 31.7 | 26 | 7.7 | 130.0 | 0.9 |
| Comparative Example 1 | 25.6 | 58 | 0.0 | 148.9 | 0.9 |
| Comparative Example 2 | 22.1 | 68 | 0.0 | 149.9 | 0.9 |
| Comparative Example 3 | 24.8 | 24 | 2.1 | 144.5 | 0.9 |
| Comparative Example 4 | 25.5 | 26 | 4.0 | 139.1 | 0.9 |

TABLE 3

|  | Solubility in xylene (wt %) | Particle size (μm) | Tensile Strength (kg/cm$^2$) | Elongation (%) |
| --- | --- | --- | --- | --- |
| Example 1 | 0.7 | 928 | 324 | >500 |
| Example 2 | 0.5 | 933 | 316 | >500 |
| Example 3 | 0.5 | 974 | 305 | >500 |
| Example 4 | 0.7 | 988 | 299 | >500 |
| Example 5 | 0.9 | 1011 | 291 | >500 |
| Example 6 | 0.9 | 111.7 | 286 | >500 |
| Comparative Example 1 | 0.6 | 898 | 353 | <100 |
| Comparative Example 2 | 0.8 | 877 | 341 | <100 |
| Comparative Example 3 | 1.2 | 895 | 311 | >500 |
| Comparative Example 4 | 1.2 | 887 | 286 | >500 |

Referring to Tables 2 and 3, it is recognizable that Examples of the present invention have the characteristics of odorless, low elution, and high tacticity because they show lower solubility in xylene than Comparative Examples. Furthermore, it is expected that the polymer can be used for fibers, particularly, filament (spunbond) nonwovens, because of their excellent tensile strength and flexibility (elongation).

What is claimed is:

1. A method of preparing a propylene-1-butene copolymer, including the step of polymerizing propylene and 1-butene in the presence of a catalyst including a metallocene compound represented by the following Chemical Formula 1:

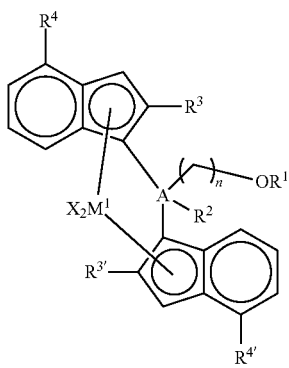

[Chemical Formula 1]

in Chemical Formula 1,
M$^1$ is a group 3 transition metal, a group 4 transition metal, a group 5 transition metal, a lanthanide transition metal, or an actinide transition metal;
X is, same to or different from each other, a halogen;
A is a group 14 element which is a bridge group connecting indenyl groups;
R$^1$ is a C$_1$-C$_{20}$ alkyl, alkenyl, alkylaryl, arylalkyl, or aryl;
R$^2$ is hydrogen, or a C$_1$-C$_{20}$ alkyl, alkenyl, alkylaryl, arylalkyl, or aryl;
R$^3$, R$^{3'}$, R$^4$, and R$^{4'}$ are, same to or different from each other, respectively a C$_1$-C$_{20}$ alkyl, alkenyl, alkylaryl, arylalkyl, or aryl; and
n is an integer of 1 to 20.

2. The method of preparing a propylene-1-butene copolymer according to claim 1, wherein R$^1$ and R$^2$ are respectively a C$_1$-C$_4$ alkyl; R$^3$ and R$^{3'}$ are respectively a C$_1$-C$_{20}$ alkyl, alkenyl, or arylalkyl; R$^4$ and R$^{4'}$ are respectively a C$_1$-C$_{20}$ aryl or alkylaryl; n is an integer of 1 to 6; and A is silicon (Si) in Chemical Formula 1.

3. The method of preparing a propylene-1-butene copolymer according to claim 1, wherein the catalyst is a supported catalyst including the metallocene compound, an alkylaluminoxane cocatalyst, and a boron-based cocatalyst which are supported on a carrier.

4. The method of preparing a propylene-1-butene copolymer according to claim 3, wherein the alkylaluminoxane cocatalyst is one or more selected from the group consisting of methylaluminoxane, ethylaluminoxane, propylaluminoxane, and butylaluminoxane.

5. The method of preparing a propylene-1-butene copolymer according to claim 3, wherein the boron-based cocatalyst is one or more selected from the group consisting of dimethylanilinium tetrakis(pentafluorophenyl)borate, trityl tetrakis(pentafluorophenyl)borate, and methylanilinium tetrakis(pentafluorodiphenyl)borate.

6. The method of preparing a propylene-1-butene copolymer according to claim 3, wherein the carrier is one or more selected from the group consisting of silica, silica-alumina and silica-magnesia.

7. The method of preparing a propylene-1-butene copolymer according to claim 1, wherein the polymerization of propylene and 1-butene is carried out at the temperature of 25 to 500 ° C. and the pressure of 1 to 100 kgf/cm$^2$ for 1 to 24 hrs.

8. The method of preparing a propylene-1-butene copolymer according to claim 1, wherein propylene and 1-butene are polymerized with the weight ratio of 99.5:0.5 to 85:15.

9. The method of preparing a propylene-1-butene copolymer according to claim 1, wherein the polymerization of propylene and 1-butene is carried out in the presence of hydrogen gas ($H_2$) of 10 to 2,000 ppm, based on the total weight of propylene.

10. A propylene-1-butene copolymer obtained by the method of claim 1, of which the melt index (MI) is 10 to 40 g/10min, measured at 230 ° C. with the load of 2.16 kg according to ASTM D1238.

* * * * *